United States Patent [19]
Bailey et al.

[11] Patent Number: 5,993,500
[45] Date of Patent: *Nov. 30, 1999

[54] FLUX MANAGEMENT SYSTEM

[75] Inventors: Joel Brad Bailey, Dallas; Donald P. Cudmore, Arlington; Tadeusz Formella, Mansfield; Sabi Avramescu, Colleyville; Anthony Prem, Arlington, all of Tex.

[73] Assignee: Speedline Technololies, Inc., Camdenton, Mo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/951,364

[22] Filed: Oct. 16, 1997

[51] Int. Cl.[6] ...................................................... B01D 53/26
[52] U.S. Cl. .................... 55/385.6; 55/410.1; 55/418.1; 55/467.1; 228/42; 34/77
[58] Field of Search .................... 95/288, 290; 55/490.1, 55/490.2, 385.1, 385.2, 392, 417, 410.1, 418.1, 428.1, 467.1, 478, 385.6; 34/73, 76, 77, 468, 469, 78; 228/42

[56] References Cited

U.S. PATENT DOCUMENTS

| | | | |
|---|---|---|---|
| 1,739,367 | 12/1929 | Love | 5/478 |
| 4,348,174 | 9/1982 | Spigarelli | 432/1 |
| 4,479,927 | 10/1984 | Gelernt | 95/290 |
| 4,771,929 | 9/1988 | Bahr et al. | 228/102 |
| 4,909,430 | 3/1990 | Yokota | 228/102 |
| 4,912,857 | 4/1990 | Parent et al. | 34/148 |
| 4,951,401 | 8/1990 | Suzuki et al. | 34/77 |
| 5,069,380 | 12/1991 | Deambrosio | 228/42 |
| 5,125,556 | 6/1992 | Deambrosio | 228/42 |
| 5,141,147 | 8/1992 | Yokota | 228/219 |
| 5,294,036 | 3/1994 | Den Dopper | 228/37 |
| 5,347,103 | 9/1994 | LeMieux | 219/400 |
| 5,481,087 | 1/1996 | Willeman | 219/388 |
| 5,573,688 | 11/1996 | Chanasyk et al. | 219/388 |
| 5,577,658 | 11/1996 | Bailey et al. | 228/222 |
| 5,611,476 | 3/1997 | Soderlund et al. | 228/42 |
| 5,615,828 | 4/1997 | Stoops | 228/223 |
| 5,617,989 | 4/1997 | Kelzer | 228/125 |
| 5,617,990 | 4/1997 | Thompson, Sr. | 228/180.1 |
| 5,622,303 | 4/1997 | Worthmann | 228/37 |
| 5,623,829 | 4/1997 | Nutter et al. | 62/5 |
| 5,641,341 | 6/1997 | Heller et al. | 95/287 |

FOREIGN PATENT DOCUMENTS

| | | |
|---|---|---|
| 0761361 | 3/1997 | European Pat. Off. . |
| 9530509 | 11/1995 | WIPO . |

*Primary Examiner*—Jay H. Woo
*Assistant Examiner*—Robert A. Hopkins
*Attorney, Agent, or Firm*—Mintz, Levin, Cohn, Ferris, Glovsky and Popeo, P.C.

[57] ABSTRACT

Volatile organic components are controlled in electronic component assembly processes to prevent deposits on finished circuit boards and the like. The method of controlling the components in a machine having a plurality of enclosed heating zones followed by at least one cooling zone containing gas, and a conveyor for passing circuit boards therethrough on a conveyor path, comprises the steps of removing a portion of gas from at least one of the heating zones, cooling and filtering the portion of gas remote from the heating zones and the cooling zone to condense at least some of the volatile components in the portion of gas, and returning the cooled and filtered portion of gas to at least one other zone of the heating zones and the cooling zone.

16 Claims, 9 Drawing Sheets

FLUX MANAGEMENT SYSTEM

FIELD OF THE INVENTION

The present invention relates to assembling electronic components on circuit boards and other substrates and more specifically to controlling volatile organic components that are produced in electronic component assembly processes.

DESCRIPTION OF RELATED ART

As well as reflow soldering machines and wave soldering machines, volatile organic compounds may be produced in other assembly processes for electronic components such as curing resin compounds for bonding components to a circuit board or other substrate. Throughout this specification the term "circuit board" includes any type of substrate assembly of electronic components.

In the production of printed circuit boards in a reflow soldering machine, solder paste is applied to the areas to be soldered. As well as solder, solder paste includes flux to promote solder wetting and provide good solder joints. Other additives may also be present in the solder paste. The circuit boards are then passed on a conveyor through a plurality of heating zones of a reflow soldering machine. As the solder paste melts, volatile components in the flux and other additives are vaporized and tend to condense in the reflow machine. Many of the reflow furnaces now solder in an inert atmosphere using primarily nitrogen to reduce oxidation on solder surfaces. In a reflow soldering machine the products to be soldered pass through the heating zones to a cooling zone.

The heating zones are separated into a number of different zones which are generally broken down into preheat zones, soak zones and spike zones. In the preheat zones and the soak zones the products are heated and the flux volatile components vaporize in the surrounding gas atmosphere. The spike zones are hotter than the preheat zones and soak zones and it is in the spike zones that the solder melts. A reflow solder machine may have many heating zones and these heating zones can be varied depending on the products to be soldered. Different products require different heat profiles and a solder machine should be flexible so that, for example, a machine with ten heating zones may have one preheat zone followed by seven soak zones and two spike zones for one type of circuit board, and for a different type of board may have three preheat zones, six soak zones and one spike zone. One or more cooling zones follow the heating zones where the solder solidifies on the solder areas of the board.

If volatile components are present in the cooling zones, then condensation occurs and the condensate can impair cooling functions and may present processing problems. The most common problem occurs with no clean, enhanced print performance solder pastes. These pastes utilize viscosity modifiers to achieve superior printing performance. Problems arise when the viscosity modification components condense in the cooling zones. By nature these residues are a viscous liquid and can build up and drip onto the soldered product from the cooling zone surfaces such as heat exchangers, etc.

A gas knife cooling system is disclosed in our U.S. Pat. No. 5,577,658 which utilizes a gas flow system to maintain constant cooling performance while greatly extending cooling module maintenance intervals. The system directs a gas stream at soldered products passing through the cooling zone on a conveyor and a heater associated with the gas knife which directs the gas stream is activated for predetermined cleaning cycles to heat the gas knife to a temperature above flux vaporization temperature of flux deposits from the soldered products.

An aim of the present invention is to remove at least some volatile organic components present in assembly processes for printed circuit boards. In one embodiment it is an aim of the present invention is to remove at least some of the vaporized flux components from a reflow gas stream of a reflow soldering machine. This is achieved by removing at least a portion of the gas from the gas stream, treating the removed portion to condense flux volatiles at a location where the condensed volatiles cannot drip onto the boards passing through the reflow soldering machine, and then returning the clean gas to the reflow soldering machine preferably downstream from where it was taken. The gas then recirculates in the machine, and by varying gas flows, cooling and other process features, one is able to control the quantities of vaporized flux components in the gas stream.

As well as removing flux volatiles from the heating and cooling zones, the cool clean gas has at least three other purposes. First it provides a cooling effect on the circuit boards, and this occurs when the clean gas is applied to any of the downstream cooling zone or zones. Secondly, the cooled gas may be applied either to the top of the circuit boards or to the bottom of the circuit boards to provide top to bottom board temperature differentials. Thirdly, the cooled gas is used to provide zone temperature segregation. Some processes require there to be a large temperature differential between adjacent zones, for example, there may be a temperature differential of 100° C. between a soak zone and an adjacent spike zone. By applying the cooled gas to the lower temperature zones, the effect of spill over heat from the hotter zone to the cooler zone is reduced, and higher temperature differentials can be achieved. This may be especially useful in conjunction with lead free alloys that require higher peak but not soak temperatures.

Having the ability to change the zone or zones that the portion of gas is removed and the zone or zones that the clean gas is returned permits system flexibility.

By providing a heat exchanger outside the heating and cooling zones of a reflow soldering machine, one is able to remove a heat exchanger for replacement without entering the zones, and thus has great maintenance advantages. In some instances valves may be positioned in the gas duct line on either side of the heat exchanger so the heat exchanger may be removed and replaced with a clean unit without shutting down the reflow soldering machine. This permits the atmospheric integrity of the machine to be retained, thus greatly reducing maintenance down time.

Reflow soldering of double sided board assemblies is today becoming more commonplace. When reflowing the bottom side of the board, the components may be held to the board only by the wetting forces of the molten solder. If the component mass exceeds this wetting force value then the component falls off. Various techniques are currently used in the industry to address this problem. In one technique adhesives are used to adhere components to the printed circuit board. This approach, however, is undesirable from an economic standpoint as it involves an additional step, namely that of applying adhesives. The present application provides a solution to these issues by directing cooled gas to cool the bottom sides of the printed circuit board assemblies in the spike zones during the peak temperature phase of reflow soldering. This technique maintains the temperature of large components on the bottom side of the boards below the molten temperature of the solder while at the same time components on the top side of the boards are brought above the molten temperature of the solder through a combination of forced convection and infrared heating directed onto the boards from the top of the reflow process area. Thus, by directing the cooled gas onto the bottom surface of the boards, one solves the problems associated with double side board assemblies without necessitating an additional process step.

In a further embodiment it may be desirable to provide more heat to the bottom of a board, in which case the clean cool gas is directed at the top of the board rather than the bottom.

In the gas knife cooling system disclosed in U.S. Pat. No. 5,577,658 a self clean cycle is provided to remove condensed flux components that are deposited on the heat exchanger. It has now been found that the number of cleaning cycles can be reduced if not eliminated which reduces production down time. Furthermore, by providing a heat exchanger remote from the heating zones, and one that can be removed and replaced with a clean heat exchanger without even having to shut down the reflow soldering machine, production down time is reduced even further, and one is able to increase production rates from a reflow soldering machine.

In the gas knife cooling system of U.S. Pat. No. 5,577,658, fresh cool feed gas is supplied to the gas knives. In the present invention a portion of gas is cooled, cleaned and recirculated, but the recirculated gas is not reapplied through gas knives. The recirculated cooled gas is applied to the printed circuit boards either from the top or from the bottom or from both depending on the requirement.

The heat exchanger is preferably a dual flow path design to provide flexibility to vary the cooling effect. The cooling may be changed by varying the gas stream flow velocity, varying the flow of cooling medium to the heat exchanger and providing a wetted length or path length through the heat exchanger that is a control variable to set the quantity of heat removed from the gas.

SUMMARY OF THE INVENTION

The present invention provides a machine for assembly of components to circuit boards comprising a plurality of heating zones in line followed by at least one cooling zone, a conveyor for passing the circuit boards through the heating zones and the cooling zone on a conveyor path, an input gas duct extending from at least one of the heating zones, a filtering and cooling device connecting to the input gas duct remote from the heating zones and the cooling zone and joined to an output gas duct connecting downstream to at least one other zone of the heating zones and the cooling zone.

The present invention also provides a method of controlling volatile components in a machine for assembly of components to circuit boards, the machine having a plurality of enclosed heating zones followed by at least one cooling zone containing gas therein, and a conveyor for passing the circuit boards through the heating zones and the cooling zone on a conveyor path, the method comprising the steps of removing a portion of gas from at least one of the heating zones, cooling and filtering the portion of gas remote from the heating zones and the cooling zone to condense at least some of the volatile components in the portion of gas and returning the cooled and filtered portion of gas downstream to at least one other zone of the heating zones and the cooling zone.

BRIEF DESCRIPTION OF THE DRAWINGS

In drawings which illustrate embodiments of the present invention.

DESCRIPTION OF THE PREFERRED EMBODIMENTS

Figure 1:
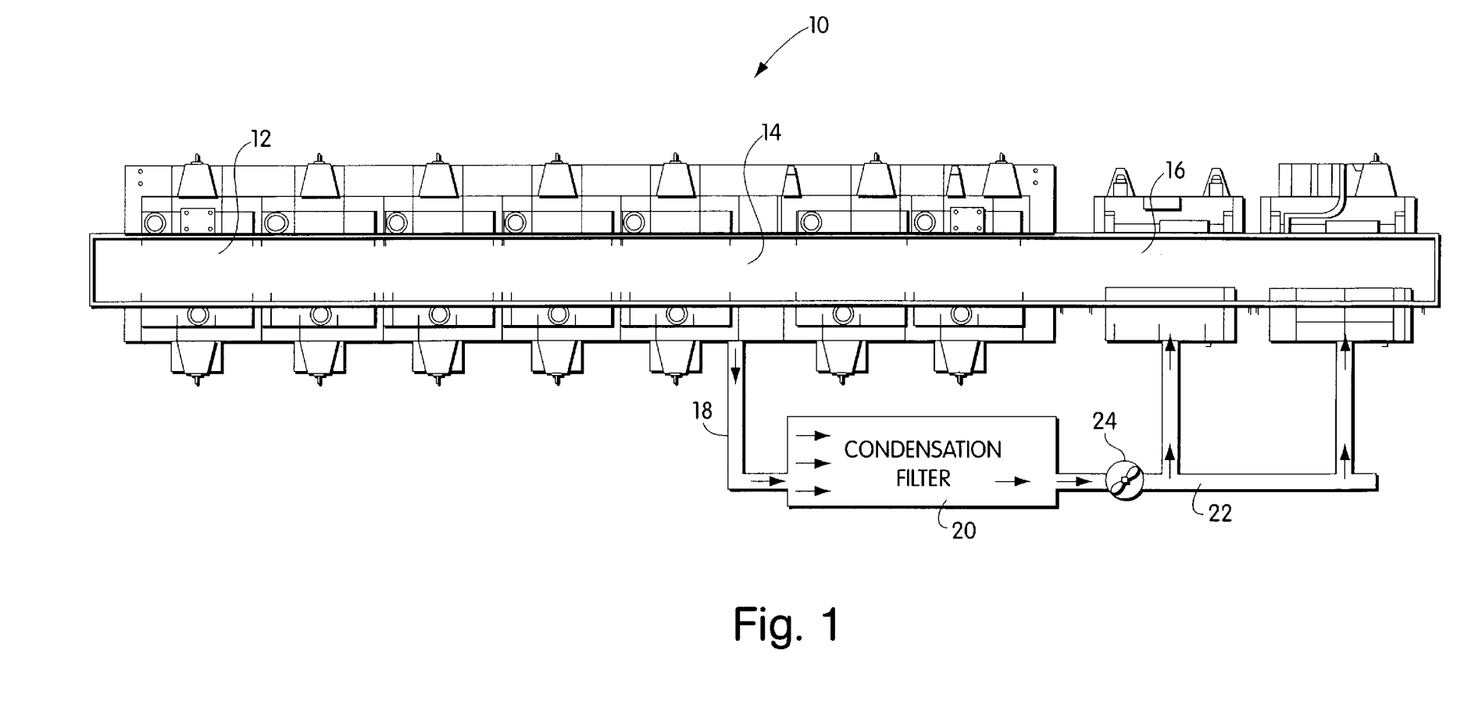
FIG. 1 is a schematic view showing a reflow soldering machine with a condensation filter according to one embodiment of the present invention.

A reflow soldering machine 10 is shown in FIG. 1 comprising a plurality of heating zones which comprise five soak zones 12 followed by two spike zones 14. Not shown in this Figure are preheat zones which precede the soak zones 12. Following the spike zones are two cooling zones 16. An input gas duct 18 is shown exiting from the fifth soak zone 12 passing through a condensation filter 20 into an output gas duct 22 which has a fan 24 therein. The output gas duct 22 splits in two with clean exhaust gas entering both of the cooling zones 16.

Figure 2:
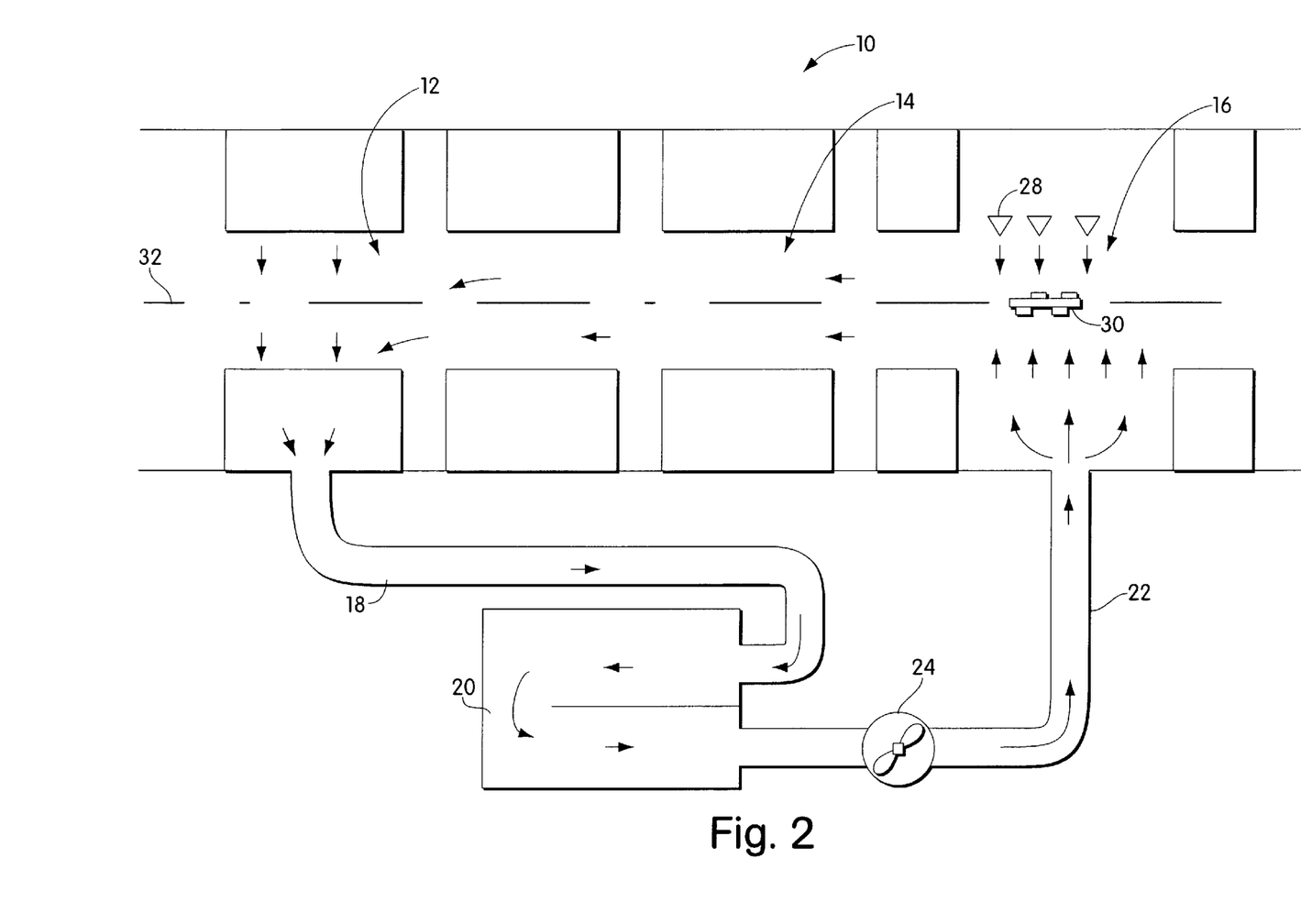
FIG. 2 is a schematic view showing a reflow soldering machine with a reverse flow condensation filter according to a further embodiment of the present invention, and with the cooled gas returning to a cooling zone.

FIG. 2 shows another embodiment of a reflow soldering machine with a cooling zone 16 having a plurality of gas knives 28 directing gas onto a circuit board 30 passing in a conveyor path 32 which is conveyed from left to right in the reflow soldering machine 10. The input gas duct 18 extends from a heating zone, in this particular embodiment a soak zone 12. This may not be the first soak zone 12 in the reflow soldering machine, but an additional soak zone 12 and a spike zone 14 are shown downstream of the soak zone from which the input gas duct 18 departs. The condensate filter 20 comprises a reverse flow heat exchanger and the output gas duct 22 is shown entering at the bottom of the cooling zone 16.

Figure 3:
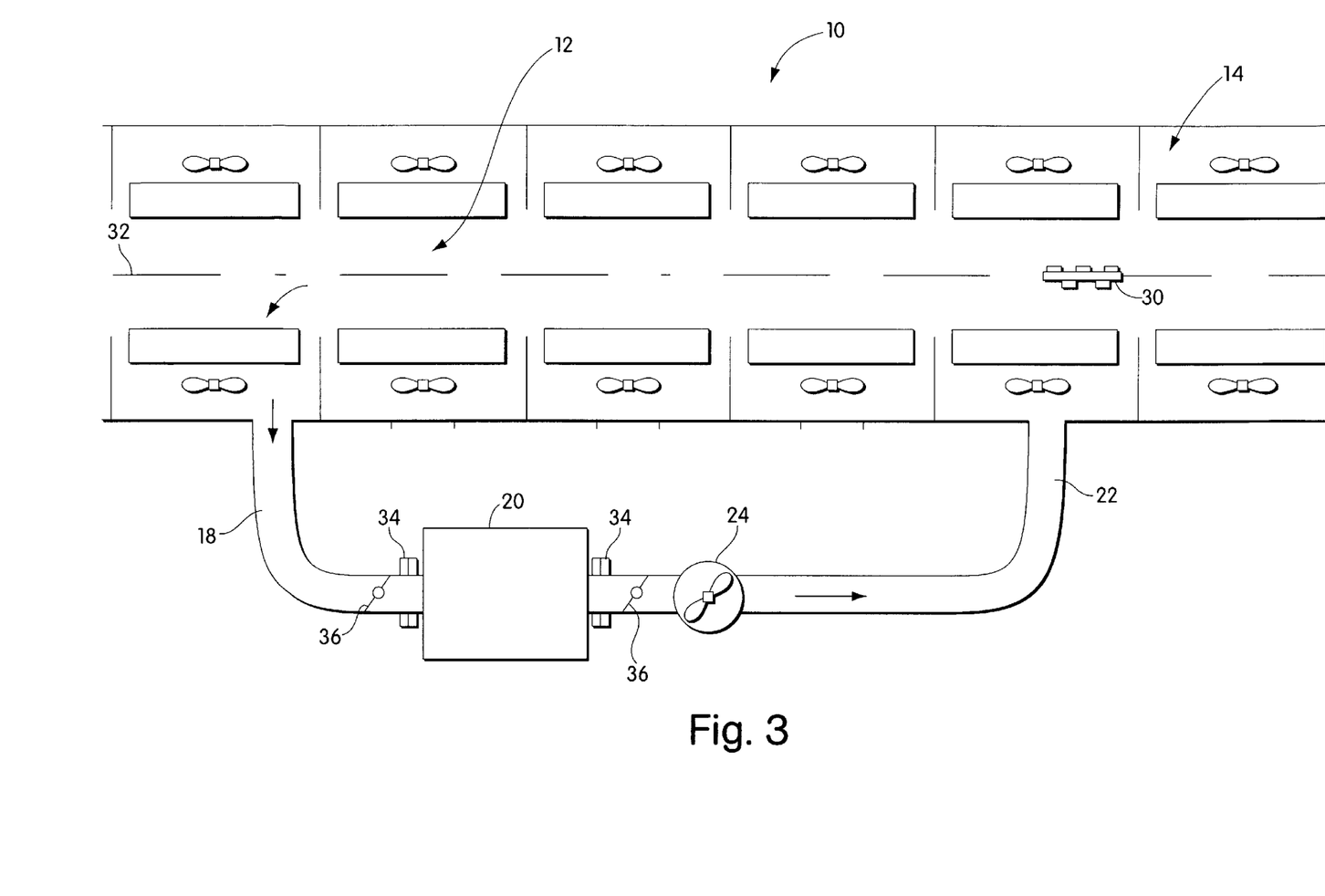
FIG. 3 is a schematic view showing a reflow soldering machine with a removable condensation filter according to yet a further embodiment of the present invention, and with the cooled gas returning to a last soak zone before a spike zone for zone segregation.

FIG. 3 illustrates a reflow soldering machine 10 with a plurality of soak zones 12 followed by a spike zone 14. As can be seen, the input gas duct 18 extends from a soak zone 12, passes through a condensate filter 20 and exits from the output gas duct 22 into a downstream soak zone 12 which is the last soak zone 12 before a spike zone 14. The cool gas permits better temperature differentials between the two zones. For certain processes temperature differentials such as 100° C. may be desired and by applying the cool gas to the cooler zone, better zone temperature segregation occurs and there is less spill over of heat from the hotter zone.

The condensate filter 20 is shown in FIG. 3 having flanges 34 on each side with valves 36 in the input gas duct 18 and the output gas duct 22. Thus the fan 24 may be turned off, the valves 36 closed and the condensate filter 20 removed from between the input gas duct 18 and the output gas duct 22 and replaced with a new condensate filter 20 without shutting down operation of the reflow soldering machine.

Figure 4:
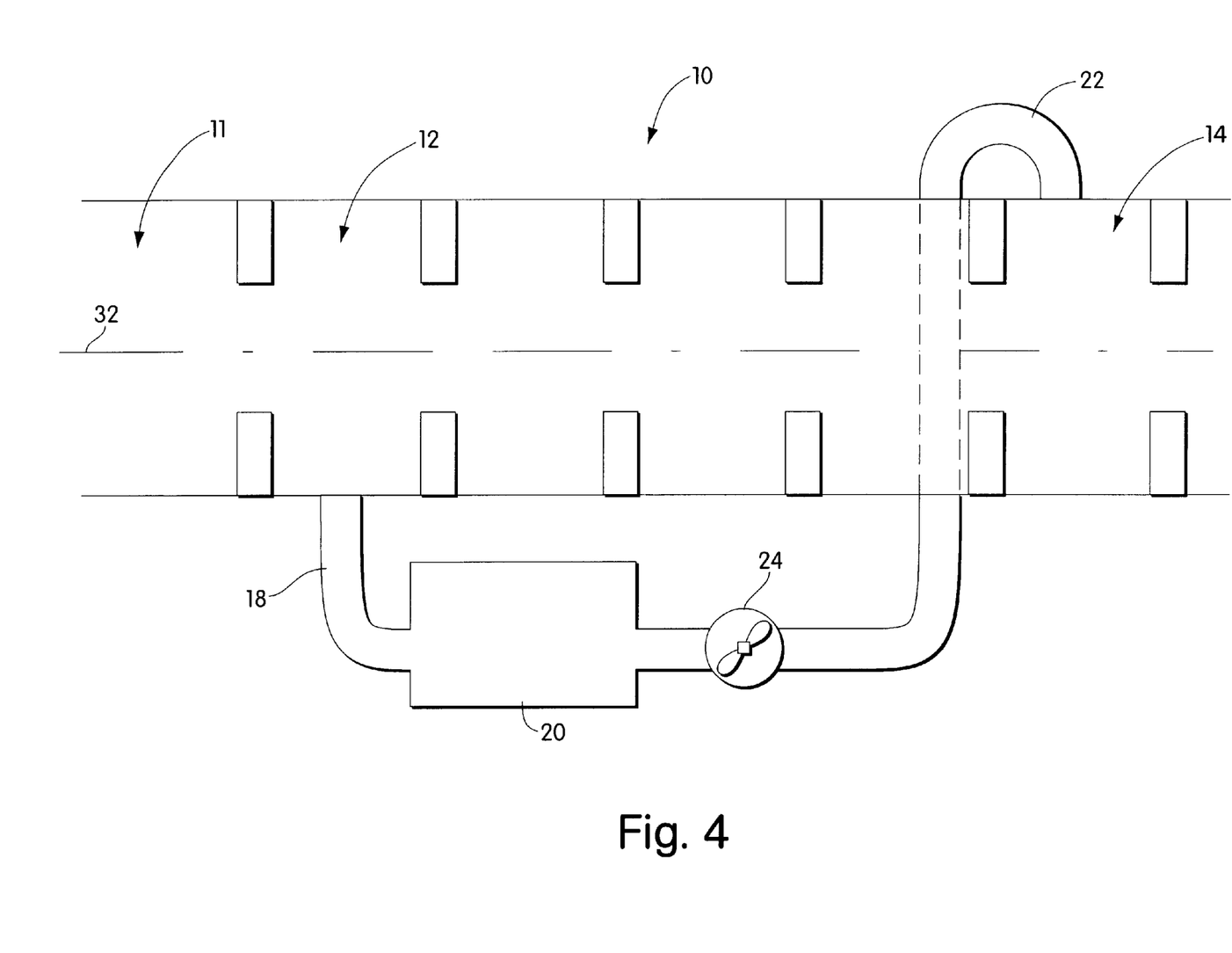
FIG. 4 is a schematic view showing a machine for processing printed circuit boards according to a different embodiment of the present invention with the gas circulating to the top of a downstream heating zone.

FIG. 4 shows a reflow soldering machine 10 which has a preheat zone 11 followed by soak zones 12 and spike zones 14. The output gas duct 22 is shown entering the spike zone 14 at the top. This permits the circuit boards 30 to be cooled at the top rather than below.

Figure 5:
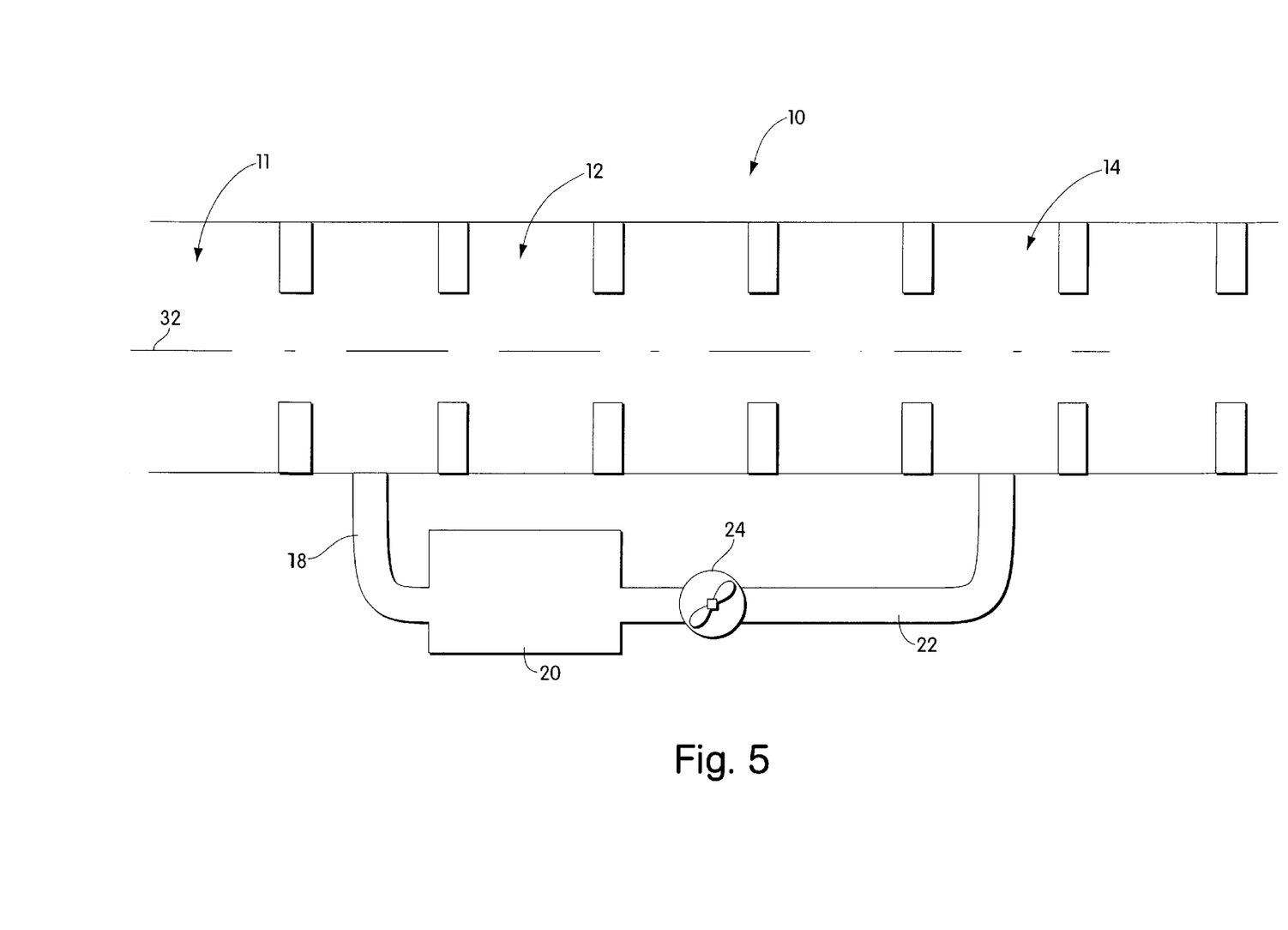
FIG. 5 is a schematic view showing a machine similar to that shown in FIG. 4 with the gas circulating to the bottom of a downstream heating zone.

FIG. 5 shows a reflow soldering machine 10, similar to that shown in FIG. 4 with the output gas duct 22 entering the bottom of the spike zone 14. This permits the circuit boards 30 to be cooled at the bottom, maintaining the bottom side cooler than the top which is applicable to double sided board assemblies.

Figure 6:
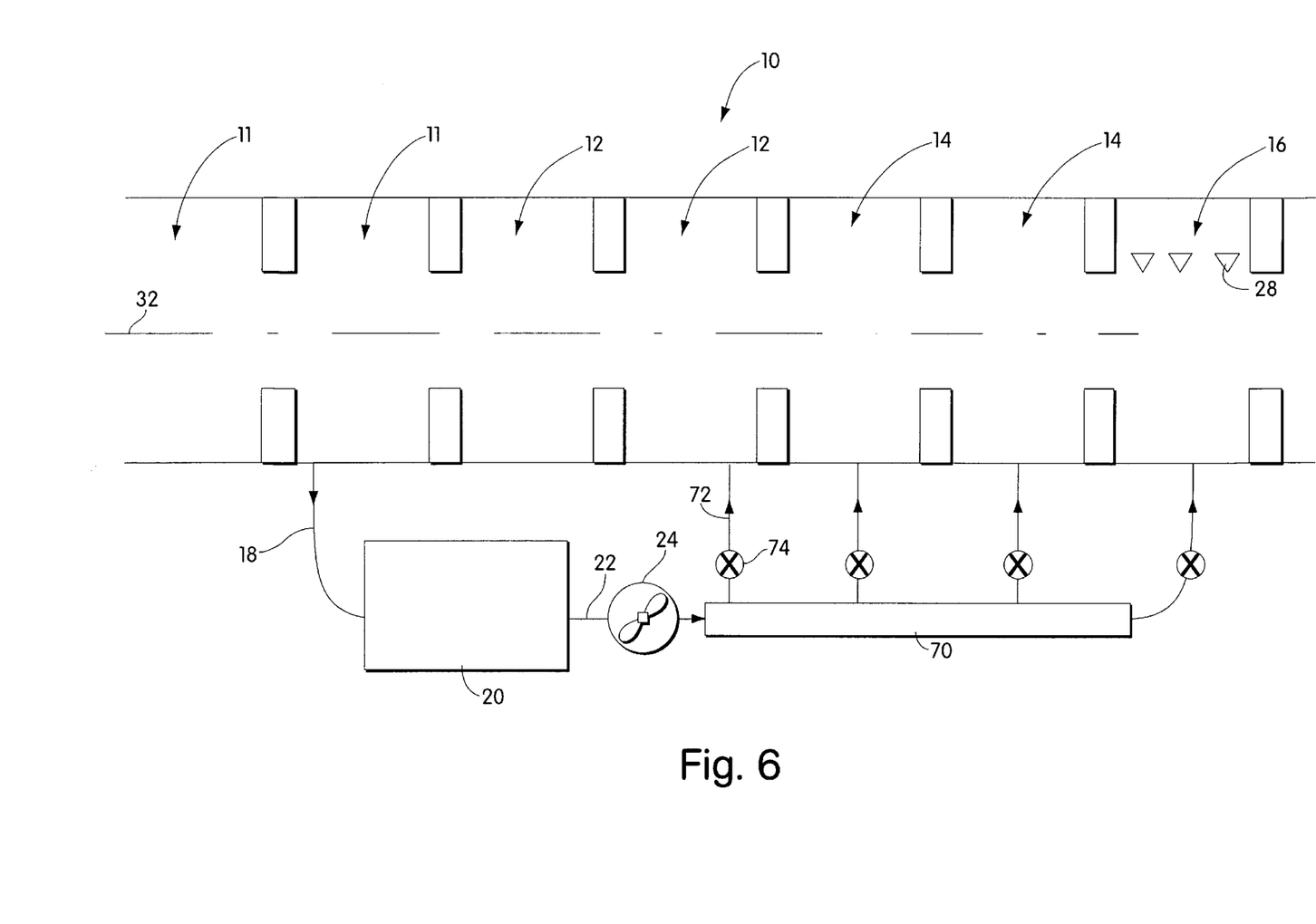
FIG. 6 is a schematic view showing another embodiment of the present invention with an outlet manifold for selecting the gas flow return.

An outlet manifold 70 is shown in FIG. 6 connected to the output gas duct 22. Four separate manifold ducts 72, each having valves 74 therein are shown connecting the manifold 70 to a soak zone 12, spike zones 14 and a cooling zone 16. The valves 74 permit the manifold ducts 72 to be opened or closed thus permitting clean gas to be circulated to different zones as required for different assembly operations.

Figure 7:
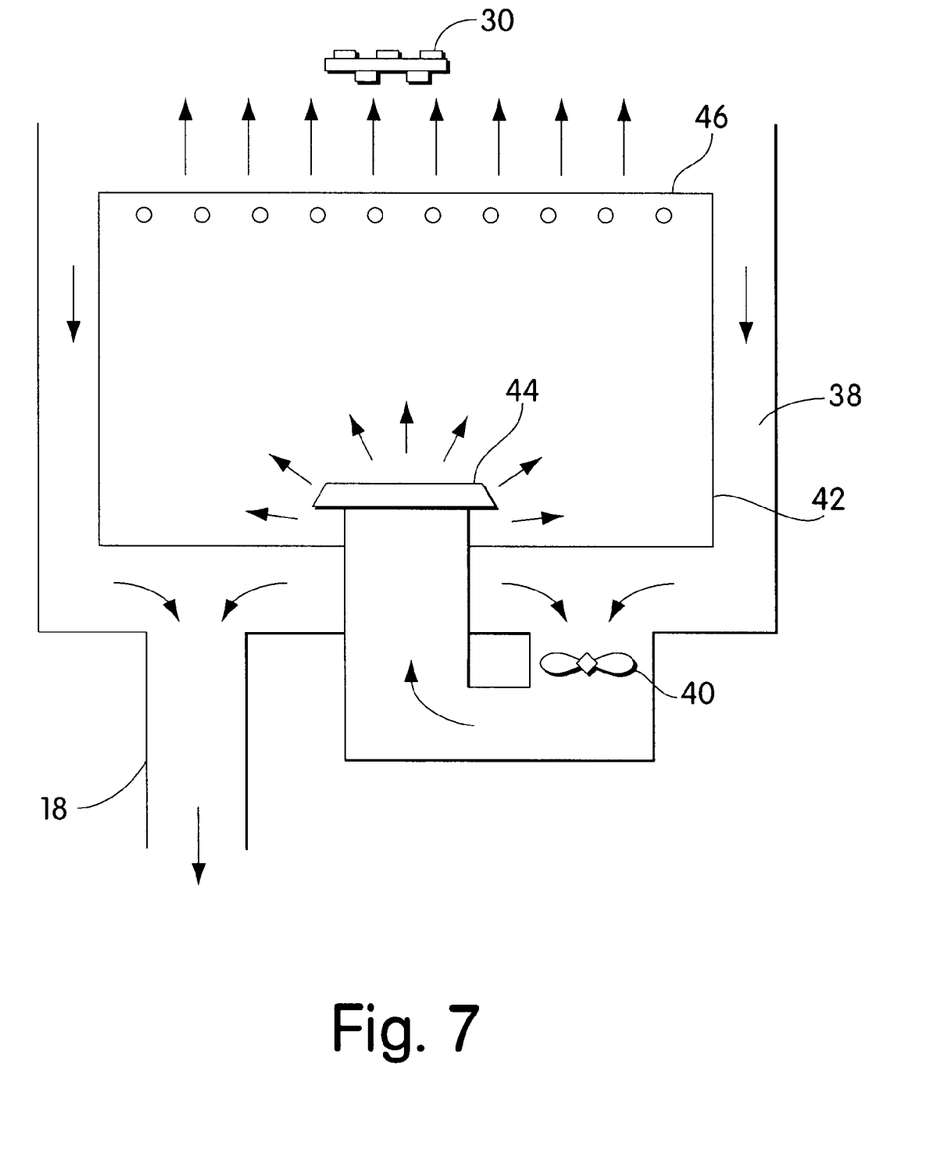
FIG. 7 is a schematic axial sectional view through a reflow soldering machine showing an outlet port for gas flow to a condensation filter according to a further embodiment of the present invention.

FIG. 7 shows an axial cross-section through a heating zone of a reflow soldering machine wherein inert gas is circulated in a circulating area 38 within the heat zone by means of a fan 40 pulling gas from the circulating area 38 surrounding the exterior of a plenum 42, and blowing gas into the plenum 42 through a diffuser 44 where it exits onto the circuit board 30 being conveyed in the reflow soldering machine. The gas exits the plenum 42 through a heater panel 46. The input gas duct 18 is shown extending from the gas circulating area 38 around the plenum 42 after exiting the heater panel 46. The heating zone may be one or more preheat zones, soak zones or spike zones and the zones themselves may be varied dependent on particular circuit board assemblies.

Figure 8:
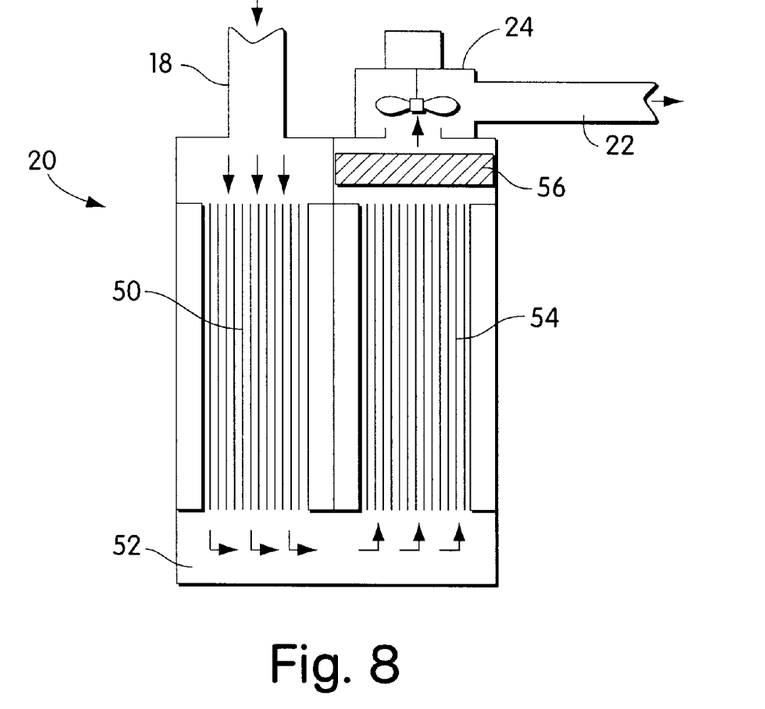
FIG. 8 is a schematic sectional plan view showing a condensation filter according to one embodiment of the present invention.
Figure 9:
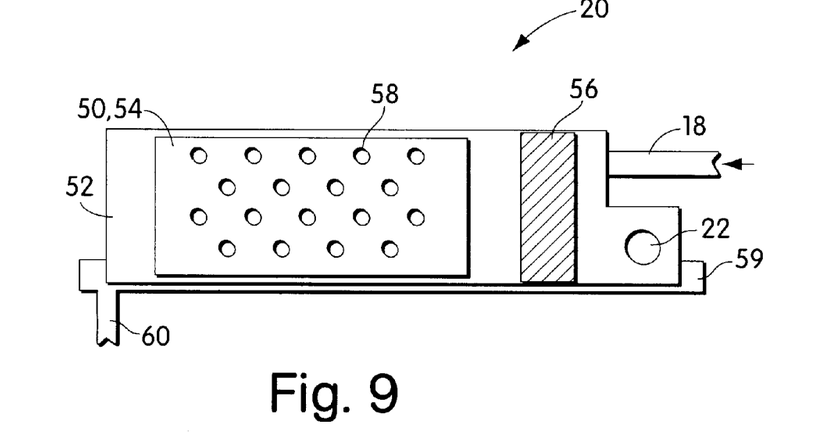
FIG. 9 is a schematic sectional side view showing the condensation filter of FIG. 5.

The condensate filter 20 is shown in FIG. 8 and 9 as being a reverse flow heat exchanger wherein gas flow passes through a first set of fins 50 into a reverse area 52 followed by a second set of fins 54 which represent energy removal units removing heat from the gas passing therethrough. Following the second set of fins 54 is a particulate filter 56 which is a standard air line filter and is provided to prevent condensation that occurs within the heat exchanger from being sucked through the fan 24 into the outlet or exhaust line 22. FIG. 9 illustrates a side view of the reverse flow heat exchanger 20 showing coolant tubes 58 passing through the fins 50 and 52 for a coolant to be circulated through the heat exchanger 20. A drip tray 59 is shown under the heat exchanger with a drain 60 for removing condensate from the heat exchanger 20.

Figure 10:
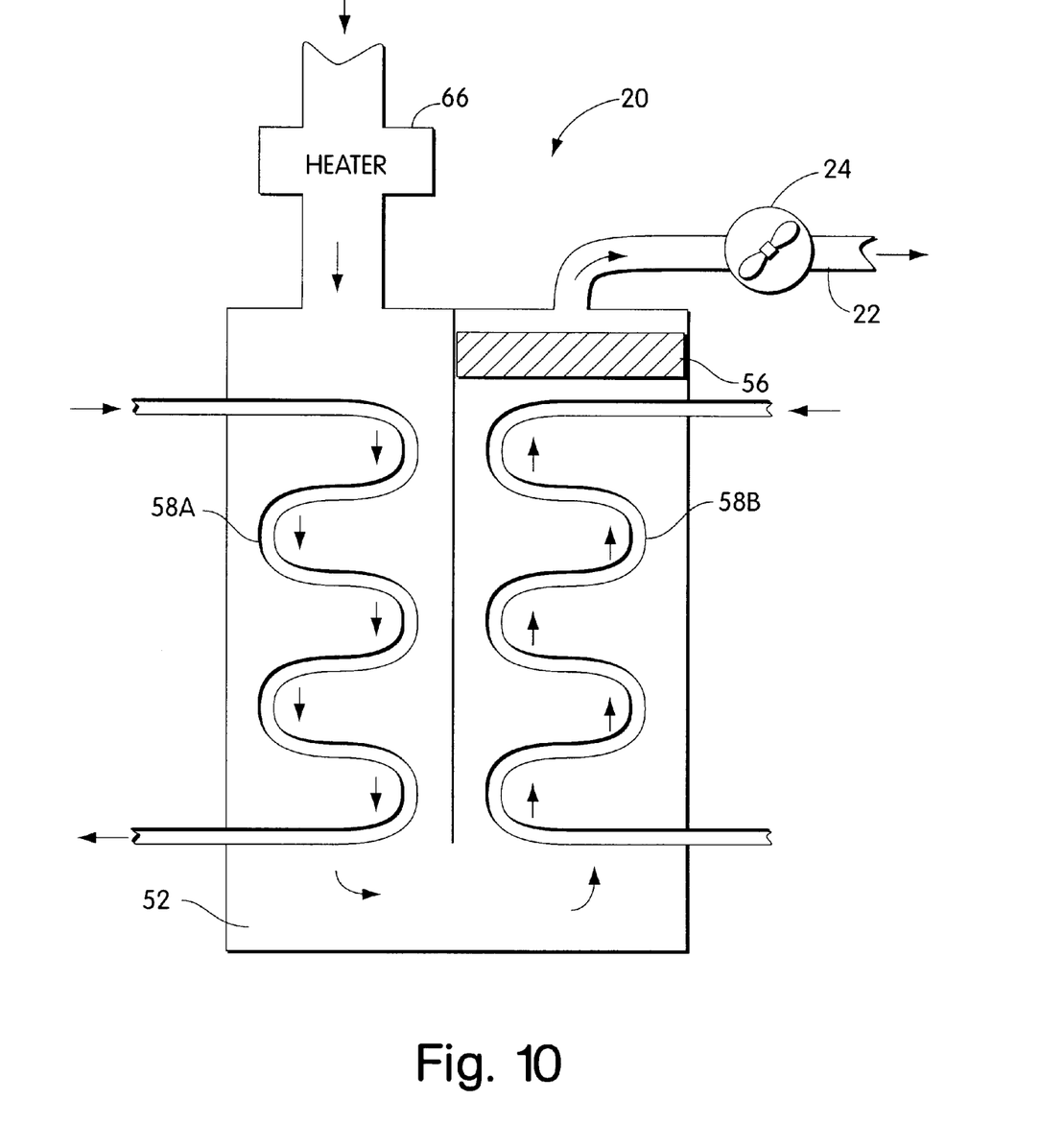
FIG. 10 is a schematic sectional view showing a condensation filter according to a further embodiment of the present invention.

The condensate filter 20 shown in FIG. 10, is a reverse flow heat exchanger with a first coolant tube 58A and a second coolant tube 58B. Fins 50 and 54, similar to that shown in FIG. 7 but not shown in FIG. 9, are also provided, thus the heat exchanger has a combination of fins and cooling tubes with coolant flowing through the tubes.

In other embodiments counter flow heat exchangers may be used wherein the coolant flows in a pipe in the opposite direction to the gas flow. Also a Peltier junction cooler which uses electrical energy in conjunction with a semi-conductor device to produce a cold surface may also be used as a heat exchanger. Different types of suitable heat exchangers include finned gas to gas heat exchangers or tube fin liquid to gas heat exchangers.

A heater 66 is shown in the input gas duct 18 of FIG. 10. The heater, preferably an electric heater, is used in a cleaning cycle to heat up the circulating gas in the input gas duct 18 to vaporize any condensate deposits that might occur in the input gas duct 18, the heat exchanger 20, and the output gas duct 22. The cleaning cycle is only used when the reflow soldering machine is not in operation, the circulating gas is heated to vaporize any condensate that may have deposited anywhere in the system.

The present invention generally applies to machines for assembling electronic components to circuit boards which have a gas atmosphere surrounding the printed circuit boards passing on the conveyor through the machine. A portion of the gas is withdrawn from at least one of the heating zones, namely preheat zones 11, soak zones 12, and/or spike zones 14, cooled which causes condensation to be removed from the gas which in effect cleans the gas and then returns the clean gas to at least one zone downstream of the zone or zones from which the portion of gas was taken, either into at least one of the soak zones 12, spike zones 14 or cooling 16 zones of the reflow soldering machine. The quantity of gas to be recirculated through the condensation filter is controlled by the fan 24 and by varying the cross-sectional areas of flow paths in the input gas duct 18 and output gas duct 22. This variation may be obtained by using dampers or valves in the ducts. With regard to the heat exchangers, it is preferred to have slower gas velocities while the gas is in contact with the heat exchangers to support the fall out of condensate, whereas high velocities are preferred in locations other than the heat exchangers, namely the input gas duct 18 and the output gas duct 22, to keep condensate materials in suspension and not have them deposited on duct surfaces. In the heat exchanger sufficient wetted length, that is to say, length that the gas is in contact with the cooling surfaces, is required to achieve the desired energy removal necessary for proper function of the system. Whereas in known reflow soldering machines, heat exchangers were included in the cooling zone or zones, in the present application the heat exchanger is remote from the heating zones and cooling zones, thus condensation that occurs in the heat exchanger is deposited into the drip tray 59 and collected by a drain 60.

Other heat exchangers may be provided within the cooling zones which either cool gas within those zones or apply fresh cooled gas to the zones, but because some of the gas in the heating and cooling zones has been cleaned, there is less flux volatile deposits on the heat exchangers in the cooling zones.

As shown in FIGS. 2 and 6, gas knives 28 may be provided in the cooling zone 16 or zones with a gas knife cooling system similar to that disclosed in our U.S. Pat. No. 5,577,658. In this system a separate heat exchanger (not shown) for cooling gas circulating to the gas knives 28 may be included in the cooling zone 16. Because there are less flux deposits in the cooling zones, fewer cleaning cycles are required avoiding fewer machine down times.

Control of the coolant passing through the tubes 59A and 59B in the heat exchanger 20 also controls the amount of energy supplied to the gas flow. Pressure differential monitoring of the gas flow across the heat exchanger 20 may be used to control and regulate the temperature drop of the circulating gas and the flow of gas circulating in the system.

When the gas is returned to either a downstream soak zone, a spike zone or a cooling zone, it recirculates in the heating zones going counter to the movement of the circuit boards on the conveyor and thus clean gas is continually circulating to reduce the flux volatiles present in the reflow soldering machine.

In one embodiment the process gas passing through a condensation filter 20 is cooled to a temperature in the range of about 25° C. to 100° C. and circulates back into the reflow soldering machine 10. For the embodiment shown in FIG. 3, gas is taken from a heat zone 12 having a set point of about 160° C. and circulated to the last soak zone 12 before the first spike zone 14. This last soak zone 12 has a set point of 170° C. The spike zone 14 has a set point of 250° C., thus the circulating cool gas assists in maintaining the temperature differential between the zones. The energy removal causes a temperature drop in the gas circulating through the condensate filter 20 of about 100° C. For the embodiment shown in FIG. 2 wherein the gas circulates to a cooling zone 16 the gas temperature drop is approximately 160° C. The temperature drop varies between about 50° C. to 200° C., depending upon the desired cooling.

Various changes may be made to the embodiments shown herein without departing from the scope of the present invention which is limited only by the following claims.

We claim:

1. A reflow soldering machine for solder joining components to circuit boards comprising a plurality of heating zones in line wherein the heating zones comprise at least one preheat zone, followed by at least one soak zone, followed by at least one spike zone, followed by at least one cooling zone, a conveyor for passing the circuit boards through the heating zones and the cooling zone on a conveyor path, an input gas duct extending from the at least one soak zone, a filtering and cooling device connecting to the input gas duct, remote from the heating zones and the cooling zone, and joined to an output gas duct connecting to at least one other zone downstream of the at least one soak zone.

2. The machine according to claim 1 including a blower located in the output gas duct.

3. The reflow soldering machine according to claim 1 including a collector tray associated with the filtering and cooling device for collecting flux residues condensed in the filtering and cooling device.

4. The machine according to claim 1 wherein the input gas duct extends from below the one of the heating zones.

5. The machine according to claim 4 wherein the output gas duct is connected to the one other zone below the conveyor path.

6. The machine according to claim 4 wherein the output gas duct is connected to the one other zone above the conveyor path.

7. The machine according to claim 1 wherein the filtering and cooling device comprises a heat exchanger with a particulate filter downstream of the heat exchanger.

8. The machine according to claim 7 wherein the heat exchanger is a tube fin type heat exchanger.

9. The machine according to claim 7 wherein the heat exchanger is a reverse flow tube fin type heat exchanger.

10. The machine according to claim 1 wherein the filtering and cooling device is removable from the input gas duct and the output gas duct and wherein valves are provided in the input gas duct and the output gas duct to isolate the filtering and cooling device when it is removed from the input gas duct and the output gas duct.

11. The machine according to claim 1 including a heater installed in the input gas duct before the filtering and cooling device, the heater adapted to heat gas circulating in the input gas duct, the filtering and cooling device, and the output gas duct to a temperature sufficient to vaporize any volatile organic compounds deposited therein.

12. A reflow soldering machine according to claim 1 wherein there are plurality of soak zones and the output gas duct is connected downstream of the last downstream soak zone and prior to at least one spike zone.

13. A reflow soldering machine according to claim 1 further comprising a gas knife cooling system disposed in the cooling zone and positioned above the conveyor, and wherein the output gas duct is connected to the cooling zone and positioned below the conveyor such that a circuit board in the cooling zone on the conveyor path is cooled on its top surface by the gas knife cooling system and on its bottom surface by the output gas duct.

14. A reflow soldering machine according to claim 1 wherein the output gas duct is connected to the spike zone.

15. A reflow soldering machine according to claim 1 and wherein the output gas duct has a manifold with a plurality of valve bodies selectively connectable to at least one of said soak zone, spike zone or cooling zone.

16. A reflow soldering machine according to claim 1 wherein the output gas duct is connected to the at least one soak zone below the conveyor such that a circuit board on the conveyor in the at least soak zone is heated on its upper surface and cooled on its lower surface to facilitate the treatment of printed circuit boards having components on both sides of the board.

\* \* \* \* \*